United States Patent
Wild et al.

(10) Patent No.: US 10,449,857 B2
(45) Date of Patent: Oct. 22, 2019

(54) INFORMATION REPRODUCTION SYSTEM FOR A VEHICLE AND METHOD FOR PROVIDING INFORMATION FOR THE USER OF A VEHICLE

(71) Applicant: VOLKSWAGEN AKTIENGESELLSCHAFT, Wolfsburg (DE)

(72) Inventors: Holger Wild, Berlin (DE); Nils Kötter, Braunschweig (DE)

(73) Assignee: VOLKSWAGEN AG (DE)

( * ) Notice: Subject to any disclaimer, the term of this patent is extended or adjusted under 35 U.S.C. 154(b) by 580 days.

(21) Appl. No.: 14/778,786

(22) PCT Filed: Mar. 10, 2014

(86) PCT No.: PCT/EP2014/054594
§ 371 (c)(1),
(2) Date: Sep. 21, 2015

(87) PCT Pub. No.: WO2014/146925
PCT Pub. Date: Sep. 25, 2014

(65) Prior Publication Data
US 2016/0046188 A1 Feb. 18, 2016

(30) Foreign Application Priority Data

Mar. 22, 2013 (DE) .......... 10 2013 002 891

(51) Int. Cl.
*B60K 35/00* (2006.01)
*B60K 37/06* (2006.01)
(Continued)

(52) U.S. Cl.
CPC .............. *B60K 35/00* (2013.01); *B60K 37/06* (2013.01); *G06F 3/0482* (2013.01);
(Continued)

(58) Field of Classification Search
CPC ...... G06F 3/048; G06F 3/017; G06F 3/04886; H04N 21/4312; H04N 21/482
See application file for complete search history.

(56) References Cited

U.S. PATENT DOCUMENTS

| 2010/0171698 A1 | 7/2010 | Kim et al. |
| 2010/0248788 A1* | 9/2010 | Yook ...................... G06F 3/0481 455/566 |

(Continued)

FOREIGN PATENT DOCUMENTS

| DE | 102007035769 A1 | 2/2009 |
| DE | 102008021186 A1 | 10/2009 |

(Continued)

OTHER PUBLICATIONS

Office Action for Korean Patent Application No. 10-2015-7030541; dated Dec. 29, 2016.

(Continued)

*Primary Examiner* — Sang H Kim
(74) *Attorney, Agent, or Firm* — Barnes & Thornburg LLP

(57) ABSTRACT

An information reproduction system for a vehicle having an input device that receives a selection signal and a processor that produces a video or control signal, as a result of which a status bar arranged at an edge of a touch-sensitive display panel of a display device and a display area adjoining the status bar are reproduced on the touch-sensitive display panel by the display device on the basis of the video or control signal device. The selection signal has information about a starting point and an end point of a movement by a user that touches the display panel of the display device without interruption. The processor produces the video or control signal on the basis of the selection signal. The (Continued)

information reproduction system also has an output device that provides the video or control signal for a display device.

12 Claims, 9 Drawing Sheets

(51) Int. Cl.
  *G06F 3/0486*    (2013.01)
  *G06F 3/0488*    (2013.01)
  *G06F 3/0482*    (2013.01)
(52) U.S. Cl.
  CPC ........ *G06F 3/0486* (2013.01); *G06F 3/04886* (2013.01); *B60K 2370/115* (2019.05); *B60K 2370/146* (2019.05); *B60K 2370/1438* (2019.05); *B60K 2370/1442* (2019.05); *B60K 2370/182* (2019.05); *B60K 2370/184* (2019.05); *B60K 2370/186* (2019.05); *B60K 2370/52* (2019.05)

(56) References Cited

U.S. PATENT DOCUMENTS

| | | | | |
|---|---|---|---|---|
| 2011/0047573 A1* | 2/2011 | Onogi | ................ | H04N 5/44543 725/41 |
| 2011/0107272 A1* | 5/2011 | Aguilar | ............... | G06F 3/04815 715/853 |
| 2012/0030628 A1* | 2/2012 | Lee | ....................... | G06F 3/0486 715/835 |
| 2012/0117601 A1* | 5/2012 | Yeh | ................... | H04N 21/4316 725/42 |
| 2012/0131519 A1* | 5/2012 | Jitkoff | .................. | G06F 3/0481 715/863 |
| 2012/0220341 A1* | 8/2012 | Sirpal | ................... | G06F 1/1616 455/566 |
| 2012/0304092 A1* | 11/2012 | Jarrett | .................. | G06F 9/4443 715/765 |
| 2012/0306782 A1* | 12/2012 | Seo | ....................... | G06F 1/1616 345/173 |
| 2014/0136977 A1* | 5/2014 | Arun | ...................... | G06F 16/40 715/716 |
| 2014/0164966 A1* | 6/2014 | Kim | ................... | G06F 3/04886 715/769 |

FOREIGN PATENT DOCUMENTS

| | | |
|---|---|---|
| DE | 102009058145 A1 | 6/2011 |
| DE | 102010013170 A1 | 9/2011 |
| DE | 102010013843 A1 | 10/2011 |
| DE | 102010048745 A1 | 4/2012 |
| DE | 102010056411 A1 | 6/2012 |
| DE | 102011112447 A1 | 3/2013 |
| JP | 2011003202 A | 1/2011 |
| KR | 20100107377 A | 10/2010 |
| KR | 20110050248 A | 5/2011 |
| WO | 2010110613 A1 | 9/2010 |
| WO | 2012108668 A2 | 8/2012 |

OTHER PUBLICATIONS

Office Action for Korean Patent Application No. 10-2015-7030541; dated Jun. 21, 2017.

Search Report for German Patent Application No. 10 2013 002 891.4; dated Feb. 18, 2014.

Search Report for International Patent Application No. PCT/EP2014/054594; dated Jun. 30, 2014.

* cited by examiner

INFORMATION REPRODUCTION SYSTEM FOR A VEHICLE AND METHOD FOR PROVIDING INFORMATION FOR THE USER OF A VEHICLE

PRIORITY CLAIM

This patent application is a U.S. National Phase of International Patent Application No. PCT/EP2014/054594, filed 10 Mar. 2014, which claims priority to German Patent Application No. 10 2013 002 891.4, filed 22 Mar. 2013, the disclosures of which are incorporated herein by reference in their entirety.

FIELD

Disclosed embodiments relate to the field of concepts for information reproduction in vehicles and relate, particularly, to an information reproduction system for a vehicle and to a method for providing information for a user of a vehicle.

BRIEF DESCRIPTION OF THE FIGURES

Exemplary embodiments are described and explained in more detail below with reference to the appended figures.

DETAILED DESCRIPTION OF THE DISCLOSED EMBODIMENTS

Figure 1:
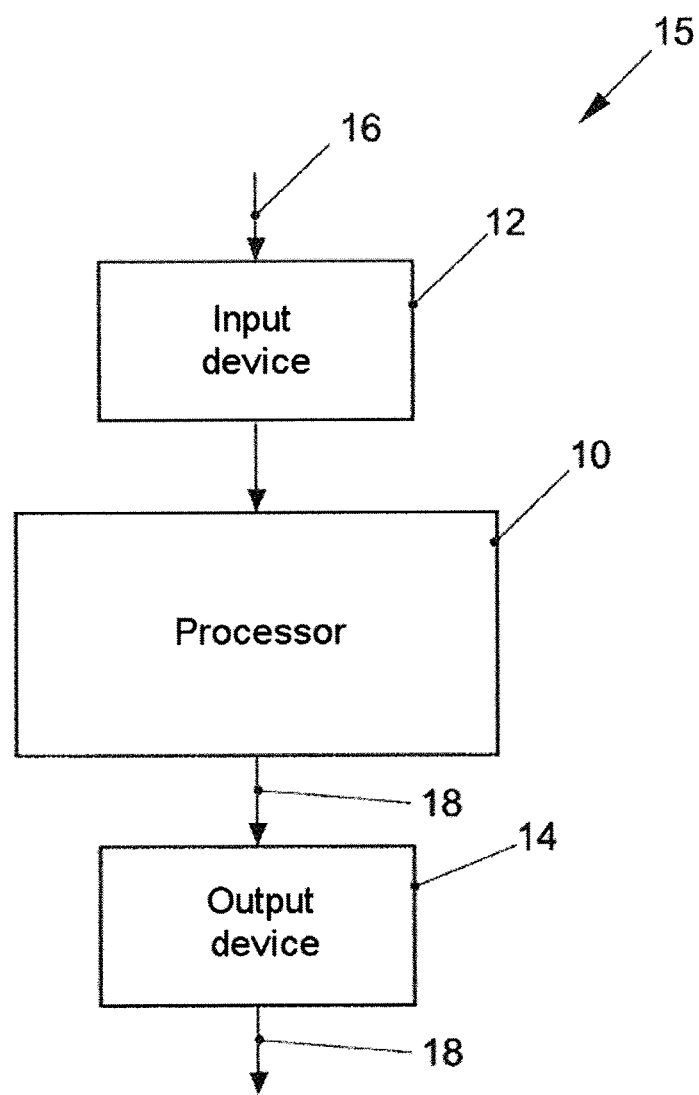
FIG. 1 shows a block diagram of an information reproduction system.

Modern vehicles today already contain a large number of units that can be used for reproducing a wide variety of information. The information to be reproduced ranges from vehicle condition parameters, such as speed, engine speed, fuel tank level or odometer, through navigation and communication information to entertainment media, such as films, radio or games. In this context, the volume of available information is becoming ever greater. Accordingly, the number and variety of display systems are also rising. Today, it is possible to find not only analog display instruments, for example, but also LED displays (light emitting diode), TFT screens (thin film transistor) or touch-sensitive screens, what are known as touch screens.

The operator control of such information reproduction systems in a vehicle, i.e., particularly menu control and the adjustment of functionalities, requires different levels of effort that requires the attention of a driver over a certain period of time. Distraction from the road should be kept as low as possible, however, to allow the safest possible use of the information reproduction system.

There is, therefore, a need to provide an improved concept for information reproduction in vehicles that allows safety of use to be increased.

Some exemplary embodiments also relate to an information reproduction system for a vehicle, having an input device that is designed to receive a selection signal. Furthermore, the information reproduction system comprises a processor that is designed to produce a video or control signal, so that a status bar arranged at one edge of a touch-sensitive display area of a display device and a display region that adjoins the status bar can be reproduced on the touch-sensitive display area by the display device on the basis of the video or control signal. In this case, the selection signal has information about a start and an end of a movement, by a user, that continuously touches the display area of the display device. In this context, the start is situated in the region of the status bar and the end is situated in the display region. The processor is then designed to produce the video or control signal on the basis of the selection signal, so that a content in a content category that is displayed so as to be selectable at the location of the start can be reproduced by the display device in at least one subregion of the display region, which subregion is situated at least to some extent in a half of the display region that comprises the end, with an information content that is extended in comparison with the information content displayed in the status bar. In addition, the information reproduction system comprises an output device that is designed to provide the video or control signal for a display device.

The user can thus select a content from the status bar that he wishes to have presented in the display region. Since this is a function that is used very frequently during the journey (e.g. display of route guidance or maps, display of address or telephone data, display of radio stations or media contents), a simple and intuitive operator control capability is desirable. Selection of a content category by touching and dragging the content to the desired presentation location allows complicated menu guidance to be avoided and the simple and intuitive operator control capability to be ensured. This can reduce the period of time that the user (e.g. the driver of the vehicle) requires to get to his desired or required information. This can significantly increase safety of use of the information reproduction system. In addition, the user can access different contents much more flexibly.

In some exemplary embodiments, the end of the continuously touching movement may be situated within a subregion of the display region that already has contents in a content category. The processor can then produce the video or control signal on the basis of the selection signal, so that the already existent content in the subregion that comprises the end can be reproduced by the display device in a manner shifted to another subregion. Hence, an already reproduced content can continue to be presented even after selection of a new content. This provides the user with a greater overview of potentially important information that he would simultaneously like to keep in view (e.g. current route guidance and air conditioning settings).

In some exemplary embodiments, the selection signal has additional information about a start, which is situated within an edge region that comprises the status bar, and an end, which is situated closer to the edge of the display area in comparison with the start, of a continuously touching movement or additional information about a contact point situated within a region of the status bar that is not associated with an information category. In this case, the edge region extends from an edge of the display area that bounds the status bar to a distance that corresponds to twice the width of the status bar. In this context, the processor is designed to produce the video or control signal on the basis of the selection signal, so that the status bar is hidden on the basis of the detected touch. Hence, the status bar can be hidden, which enlarges the display region, this being desirable when a selection of contents needs to be retained over a relatively long time.

In addition, the selection signal can optionally have information about a start, which is no more than a width of the status bar away from the edge of the display device, and an end, which is situated further away from the edge of the display device in comparison with the start, of a continuously touching movement, can have information about a contact point situated no more than the width of the status bar away from the edge of the display device or can have information about an approach by a user to the display device. In this context, the processor is designed to produce the video or control signal on the basis of the selection signal, so that the status bar is shown on the display area of the display device. Should the selection of a new content category become necessary again, the status bar can very easily be shown again. As a result, the selection options are immediately available again.

In some exemplary embodiments, the selection signal has information about a start, which is situated within a subregion that reproduces a content in a content category, and an end, which is situated closer than a predefined distance to the right-hand or left-hand edge of the display area of the display device as seen by a user, of a continuously touching movement. In this context, the processor is designed to produce a further video or control signal on the basis of the selection signal, so that at least part of the content of the subregion having the start can be reproduced on a further additional display unit. Thus, if the user wishes to have a piece of information on another unit, this information can be transmitted by simply dragging the content from one unit to the other. By way of example, this may be desirable because a combined instrument may be better situated in the field of view of the user than a center console instrument, for example. This allows a driver to keep his eye on the combined instrument and the road ahead of him simultaneously, for example. This additional function allows a further increase in safety of use.

In some exemplary embodiments, the selection signal additionally has information about a contact point situated within a control bar that is reproduced at one edge of the display area of the display device. In this context, the processor is designed to produce a control signal on the basis of the selection signal, so that a functionality corresponding to a content category that is displayed in the display region and that adjoins the control bar is controlled on the basis of the information about the contact point. The possibility of displaying contents and controlling functionalities on the same unit significantly simplifies operator control. In addition, handling of the information reproduction system becomes more intuitive, since operator control is interactive as a result of the simultaneous presentation and control. The user can access different functionalities in the vehicle (e.g. air conditioning system, radio, telephone) much more quickly.

In the subsequent description of the appended figures, which show exemplary embodiments, like reference symbols denote like or comparable components. In addition, summarizing reference symbols are used for components and objects that occur multiple times in an exemplary embodiment or in a drawing but that are described together in respect of one or more features. Components or objects that are described using like or summarizing reference symbols may be embodied in the same way, but possibly also in different ways, in respect of single, multiple or all features, for example their dimensions, unless the description explicitly or implicitly reveals otherwise.

FIG. 1 shows a block diagram of an information reproduction system 15 for a vehicle in accordance with at least one exemplary embodiment. The information reproduction system 15 for a vehicle comprises an input device 12, a processor 10 and an output device 14. In this case, the processor 10 is connected to the input device 12 and to the output device 14. The processor 10 produces a video or control signal 18, 18a, so that a status bar arranged at one edge of a touch-sensitive display area of a display device and a display region that adjoins the status bar can be reproduced or are reproduced on the touch-sensitive display area by the display device on the basis of the video or control signal 18, 18a. In addition, the input device 12 receives a selection signal 16 that has information about a start and an end of a movement, by a user, that continuously touches the display area of the display device. When the start is in the region of the status bar and the end is in the display region, the processor 10 produces the video or control signal 18 on the basis of the selection signal 16, so that a content in a content category that is displayed so as to be selectable at the location of the start can be reproduced or is reproduced by the display device in at least one subregion of the display region, which subregion is situated at least to some extent in a half of the display region that comprises the end, with an information content that is extended in comparison with the information content displayed in the status bar. The output device 14 additionally provides the video or control signal 18 for a display device.

The concept described allows the safety of use of an information reproduction system 15 in a vehicle to be increased, since the user can get to the information that he requires or desires in a simple and lucid manner. The capability for the user to select any content categories in the easily comprehensible status bar on the display area and to display the content by means of a simple gesture means that the information that he desires is available quickly and without great effort. The selection of contents using the status bar affords a quicker alternative to complicated control, e.g. using a main menu. The presentation of contents at the end of the touching movement ensures an intuitive operator control capability for the information reproduction system 15. This allows the user to concentrate better on steering the vehicle overall, for example, and nevertheless to obtain the desired information.

By way of example, the input device 12 may be a standalone hardware unit (e.g. a receiver connected to a communication bus) or else part of the processor (e.g. input interface of the processor).

The selection signal 16 can have a wide variety of information that is related to operator control of the information reproduction system 15. At the least, the selection signal 16 contains information about the start and an end of a continuously touching movement, by a user, when a user selects an information category in the status bar and uses the end of the touching movement to stipulate the presentation location. If the end is situated in the left-hand half of the display region, for example, the presentation location can comprise, by way of example, one third of the display region, which is situated in the left-hand half of the display region, or two thirds of the display region, which encompass the left-hand half completely. If the location of the start has an associated content category, then a selection can be made by the touch: In this case, the information can occur in the selection signal 16 at successive times or else at arbitrarily staggered times, for example. In addition, the information may be encoded in the selection signal, so that the processor 10 can reconstruct the relevant information again.

The status bar can therefore perform the function of a selection region. The information reproduction system 15 can display content categories that are selectable in the status bar for the user on the basis of the video or control signal 18. By way of example, the status bar is a region of the display area used on a display device in which content categories that are able to be selected by symbols or short text (e.g. abbreviations or keywords) are displayed. This region is situated at one edge of the display area. By way of example, an edge of the display area also bounds the region of the status bar at least on one side. This may be at the top, bottom, left-hand or right-hand edge of the display area, for example, as seen by a user.

In this case, the display area of a display device is, by way of example, a maximum area of the display device on which a content that can be altered in a manner visible to the user can be displayed on the basis of the video or control signal 18. This may be smaller in comparison with a maximum display area of the display device (which is usually rectangular or square), since portions thereof may be concealed from the user of other vehicle parts for functional reasons or design reasons.

By way of example, the display device may be a touch-sensitive screen, what is known as a touch screen. The display device may be permanently installed at any location in the vehicle (e.g. in the central region or the center console of the vehicle) or else may be transportable (e.g. a cell phone or tablet).

The display region is used for reproducing contents in one or more content categories. The display region occupies a much larger subarea of the display area of the display device (e.g. a subarea that is more than twice, more than five times or more than ten× as large) than the status bar. Therefore, the display region can be used to display contents in a content category having a much larger information content for the user than the status bar. The display region adjoins the status bar. In other words, at least one portion of an edge of the status bar also forms a portion of an edge of the display region. By way of example, a subregion of the display region is a region in which a display device can display contents in one or more content categories on the basis of the video or control signal 18, 18*a*. By way of example, two subregions can exist. The size ratio therefor can be ½:⅓:⅔ or ¼:¾, for example. If the display region is divided, the subregions can adjoin one another. If the display region has no further division, it is possible for a content to be presented on the entire display region. With the limitation to the display region or subregions of the display region, content having more information content than in the status bar can be presented.

A continuously touching movement may be what is known as a drag movement. A user can carry out this movement with his finger, for example, or else with an item, e.g. an operator control element. The finger of the user or the item is in constant contact with the touch-sensitive display area for this purpose. When the user places his finger or an item onto the display area, he can thereby define a start. When the user removes his finger or an item from the display area, he can thereby define an end. Since a finger or an item usually has a finite contact area, the start and/or the end can correspond to an area centroid of the respective contact area, for example, or can correspond to a first point that the touch-sensitive display area records when the display area is approached and to a last point that the touch-sensitive area records when the display area is cleared.

By way of example, a content category can represent a generic term, such as media, maps, navigation, journey-related information or safety-relevant data, or else a subordinate term, such as particular radio stations, artists, music albums, single songs, map details, routes, destinations, waypoints, engine speed, fuel consumption, oil level or the distance from a vehicle traveling in front.

A content in a content category can contain detail information for the content category, for example. The content is thus thematically associated with the content category. By way of example, it is thus possible for a navigation map to be associated, as content, with the content category Navigation, but not with the content category Radio Stations. In other words, a displayed content can be associated with a content category, that is to say, by way of example, the name and frequency of a radio station in the content category Radio, the name of a currently playing song, possibly with the name, artist, album, year of release or a timeline in the content category Song To Be Played, a map representation or a route profile in the content category Navigation or digitally presented visualizations of the tachometer or fuel tank display in the content category Vehicle Condition. In other words, contents to be reproduced may be a wide variety of types, as may their sources. By way of example, content to be reproduced may be entertainment information (e.g. film, radio or games), vehicle condition information (e.g. speed, engine temperature, engine speed or odometer reading), communication information (e.g. telephone book) or navigation data. A content or a piece of information can be defined arbitrarily in this case. By way of example, a content may be a single bit or a plurality of bits of the video or control signal, a value to be presented (e.g. speed), an entire image (e.g. an image of a navigation map or a compilation of reproducing contents that are presented on an image together), or an image detail or the like. Accordingly, an information source may be a DVD players, a radio, a computer, a laptop, a vehicle sensor or a navigation unit, for example. The information can be provided in a data format that is customary for the respective information source.

The processor produces the video or control signal 18, so that the content in the selected content category in at least one subregion of the display region, which subregion is situated at least to some extent in a half of the display region that comprises the end. In other words, the content is at least to some extent in that half of the display region that also contains the corner point. In this case, the display region may be divided into two halves vertically or horizontally, for example, as seen by the user. By way of example, the display region can be divided vertically as seen by the user when the status bar extends essentially (with its longer side) along a horizontal edge of the display area, and vice versa. By way of example, displaying the content in the half of the end at least to some extent means that the region in which the content is displayed can also extend into the other half. In addition, it also means that the end does not have to be situated in the region in which the content is displayed, since this region may also be much smaller than one half of the display region (e.g. ⅓ or ¼) and it is sufficient for the end of the touching movement to select that half of the display region in which the content is intended to be displayed. However, the end may also be situated in the region in which the content is displayed.

A vehicle may be a motorcycle, an automobile, a truck, a ship or an airplane, for example. The user of the information reproduction system 15 may be a driver or a passenger of a vehicle, for example.

The processor 10 can, by way of example, provide the video or control signal 18 in a format that can be processed by the display device (or else by additional display devices) for the purpose of reproducing information (e.g., images).

The display device and any further display device may be optional portions of the information reproduction system 15, or external components to which the information reproduction system 15 can be connected.

The display device furthermore also performs the function of an input device, which produces the selection signal 16 and provides it for the input device 12 of the processor 10, for example. The display device is furnished with touch sensitivity (what is known as a touch screen).

The text below describes further exemplary embodiments, which provide optional, additional or alternative functionalities but which can be combined, individually or in combination with one another, with the previously described concept and one or more of the described exemplary embodiments.

By way of example, an information reproduction system 15 may be part of what is known as an infotainment system (from information and entertainment). In this case, the input device 12 can correspond generally to a reception means, such as a receiver, an interface, a port, etc. The input device 12 can comprise an interface for wireless or wired communication, for example.

The video or control signal 18 may be an electronic signal, an optical signal or a radio signal, for example. The status bar may be embodied as a pure text menu, graphical representations (what are known as icons), or as a mixture of the two, for example. In a similar manner to the input device 12, the output device 14 may be an interface or a port, for example, or else any type of transmission device or an interface to such a device. The same or similar wireless or wired communication options are suitable in this case, as in the case of the input device 12. By way of example, the input device 12 and the output device 14 may be integrated in the processor 10 or be external components that are connected to the processor 10 via a data bus system, for example.

Figure 2A:
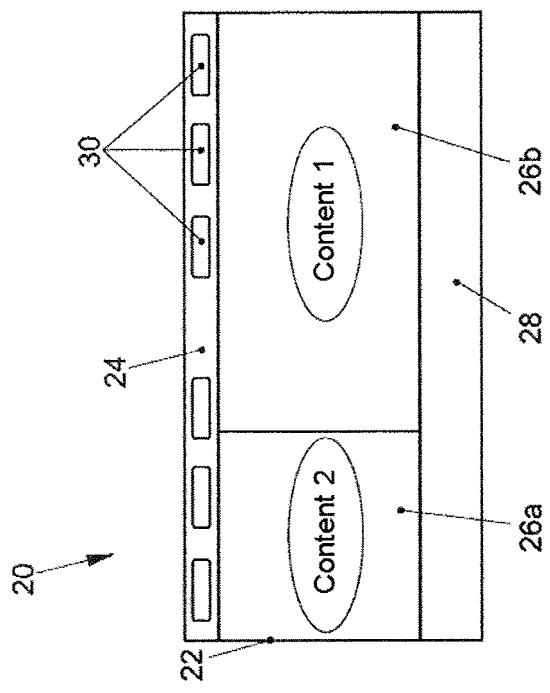
FIGS. 2a and 2b show schematic examples of the selection of content categories from the status bar.
Figure 2B:
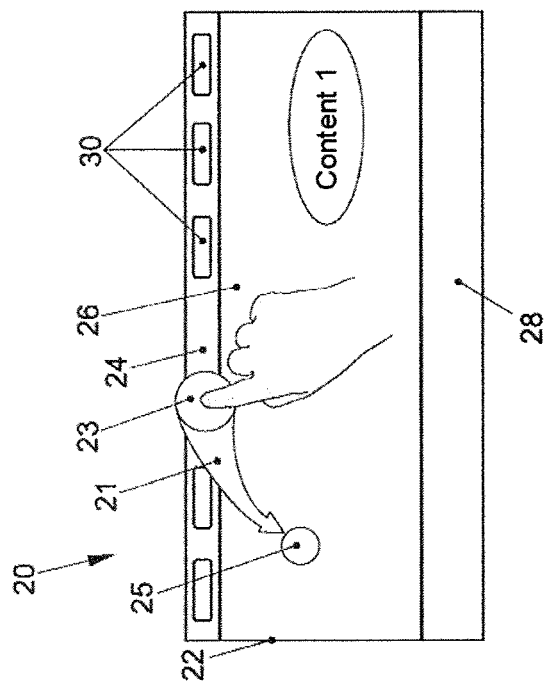

FIGS. 2a and 2b show an example of a presentation on a display device 20. In this case, the operator control steps of selection of a content category 30 (FIG. 2a) and of presentation of the content category 30 (FIG. 2b) are explained for this example. The display area 22 comprises the status bar 24, the display region 26 and optionally or additionally a control bar 28. In the example, the status bar 24 shows various content categories 30. An arrow marks the continuously touching movement 21 from a start 23 to an end 25. FIG. 2a already shows a single content denoted "Content 1" in the entire display region 26. By setting the start 23, the user selects a content category 30 at the location of the start 23. By "dragging" to the end 25, the new content "Content 2" can be presented in the display region 26 in addition to "Content 1". To this end, as FIG. 2b shows, the display region 26 can be divided into two subregions 26a, 26b, which each present one of two contents. In the example shown, the end 25 is situated in the left-hand half or the display region and in the subregion in which the content in the selected content category is displayed.

In general terms, in exemplary embodiments, the processor 10 can produce the video or control signal 18, 18a on the basis of the selection signal 16, so that the content in a content category 30 that is displayed so as to be selectable at the location of the start 23 can be reproduced by the display device 20 in at least one subregion 26a, 26b of the display region, which subregion comprises the end 25, with an information content that is extended in comparison with the information content displayed in the status bar 24a. In other words, a selected content can be reproduced in a subregion 26a, 26b such that the subregion contains the end 25. As a result, the end 25 and the subregion 26a, 26b are also situated in the same half of the display region at least to some extent. In the example of FIGS. 2a and 2b, the size of the subregion 26a presenting the "Content 2" is one third of the entire display region. The subregion 26a may alternatively also be larger or smaller, however. By way of example, the subregion 26a may also cover two thirds of the display region.

Alternatively, the processor 10 can produce the video or control signal 18 on the basis of the selection signal 16, so that the end 25 is situated outside the subregion 26a, 26b reproducing the content. In other words, the end 25 and the subregion 26a, 26b reproducing the content are situated in the same half of the display region but do not overlap one another. By way of example, this may be the case when the subregion 26a, 26b reproducing the content covers less than half of the display region. Since the position of the presented content is dependent on whether the end 25 is situated on the right-hand or left-hand, upper or lower half, operator control becomes very intuitive. To a certain extent, the user can drag the content to the side on which it is intended to be presented.

In some exemplary embodiments, the processor produces the video or control signal 18 such that in addition to the content in a content category 30 that is displayed so as to be selectable at the location of the start 23 a content in at least one further content category 30 can be reproduced or is reproduced by the display device 20 in at least one further subregion 26a, 26b of the display region. In other words, when a content is already presented in a subregion 26a, 26b, it is simultaneously possible to present yet a further content in another content category 30 in a further subregion 26a, 26b. By way of example, a user is therefore able to additionally present, besides a content category 30 that has just been selected, another previously selected content category 30. By way of example, in addition to a route profile that has already been presented, it is also possible to display a fuel tank display or a received radio station.

Figure 3A:
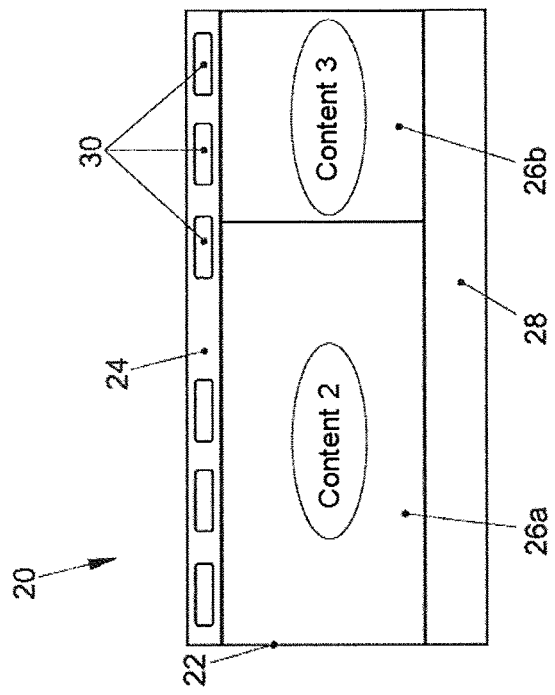
FIGS. 3a and 3b show schematic examples of the selection of content categories from the status bar.
Figure 3B:
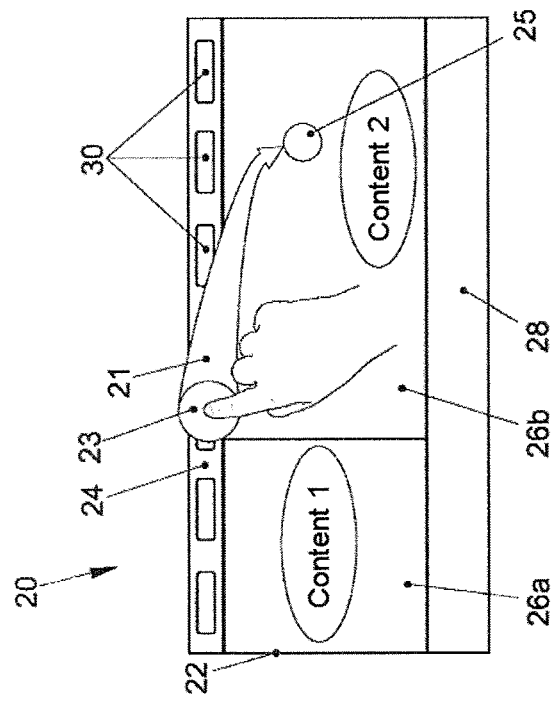

In some exemplary embodiments, the end 25 is situated within a subregion 26a, 26b of a display region, which subregion already has contents in a content category 30. In this case, the processor 10 produces the video or control signal 18, 18a on the basis of the selection signal 16 such that the already existent content in the subregion 26a, 26b comprising the end 25 is reproduced by the display device 20 in a manner shifted to another subregion 26a, 26b. In other words, before reception of the information from the end 25, the display region has at least two subregions 26a, 26b in which contents are already presented. By way of example, FIG. 3a shows such a configuration in which a content "Content 1" is presented in a smaller subregion 26a and a content "Content 2" is presented in a larger subregion 26b. When a user now drags a content "Content 3" in a content category 30 to an end 25 that is situated within the subregion 26b presenting "Content 2", the new content "Content 3" is presented in a subregion 26b that is situated at least to some extent in the half of the display region that comprises the end 25. It is then possible for "Content 1" to disappear and "Content 2" to continue to be presented, for example. However, the subregion 26a associated with "Content 2" is shifted to the half of the display region that does not contain the end 25. "Content 2" in the subregion comprising the end 25 is therefore presented at least to some extent in the subregion that has previously presented "Content 1". The position of the content to be presented can be dependent on the side of the display region 22 on which the end 25 is situated. FIG. 3*b* shows a presentation of a newly selected content "Content 3", together with an already existent content "Content 2". In the example, two subregions having a size ratio of ⅓:⅔ are shown, but there may also be more than two subregions or subregions in a different size ratio (e.g. ⅖:⅗ or ¼:¼:½).

In some exemplary embodiments, the selection signal 16 can additionally, alternatively or optionally have information about a start, which is situated within an edge region comprising the status bar, and an end, which is situated closer to the edge of the display area in comparison with the start, of a continuously touching movement or additional information about a contact point that is situated within a region of the status bar that is not associated with an information category. In this case, the edge region extends from an edge of the display area that bounds the status bar to a distance that corresponds to twice the width (or three times or 1.5 times the width, for example) of the status bar. In other words, the selection signal 16 can have information start 23, which is situated within an edge region of the status bar 24 that is opposite the edge of the display device 20 and that extends by no more than a width of the status bar 24 from the edge thereof, and an end 25, which is situated closer to the edge of the display device 20 in comparison with the start 23, of a continuously touching movement 21 or information about a contact point that is situated within a region of the status bar 24 that is not associated with an information category. The processor 10 can then prompt the status bar 24 to be hidden on the basis of the captured touch. In other words, a user can have the status bar 24 hidden, this being able to be accomplished by means of several possible inputs.

Figure 4A:
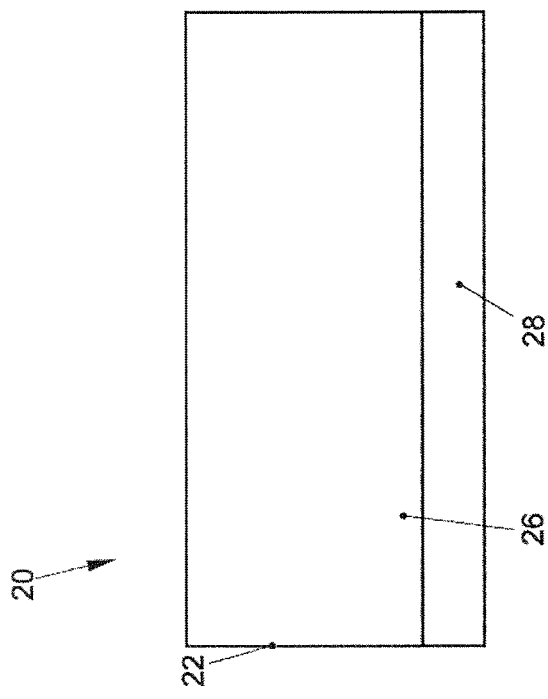
FIGS. 4a and 4b show a schematic illustration of the showing and hiding of the status bar.

If the status bar 24 is situated at the upper edge of the display region 22, for example, as shown in FIG. 4*a*, a user can begin the start 23 of a touching movement 21 just beneath the status bar and perform the touching movement in an upward direction. A further possibility would be for a user to touch the status bar 24 without subsequent movement, and for the touch in this case to be made in an "empty" region of the status bar 24 that has no associated information category 30. The hiding of the status bar 24 allows more lucid presentation of contents, since in this way there is more space available on the display area 22. In the example, the edge region extends to no more than a width of the status bar 24 beyond the edge thereof. Alternatively, this edge region may also be smaller, however, for example half the width of the status bar 24. The cycle described in FIGS. 4*a* and 4*b* can be carried out several times in succession, and using a plurality of different methods, however. A corresponding piece of information can accordingly be staggered over time in the selection signal 16, or produced again and again at a later time, specifically using different methods in each case, so that the selection signal 16 can have the information both about a start 23 for a touching movement 21 and the touching movement 21 itself and about a contact point, for example.

In addition, in some exemplary embodiments, the selection signal 16 can have information about a start 23, which is no more than a width of the status bar 24 away from the edge of the display device 20, and an end 25, which is situated further away from the edge of the display device 20 in comparison with the start 23, of a continuously touching movement 21, can have information about a contact point situated no more than the width of the status bar 24 away from the edge of the display device 20 or can have information about an approach by a user to the display device 20. The processor 10 can then prompt the status bar 24 to be shown on the display area 22 of the display device 20.

Figure 4B:
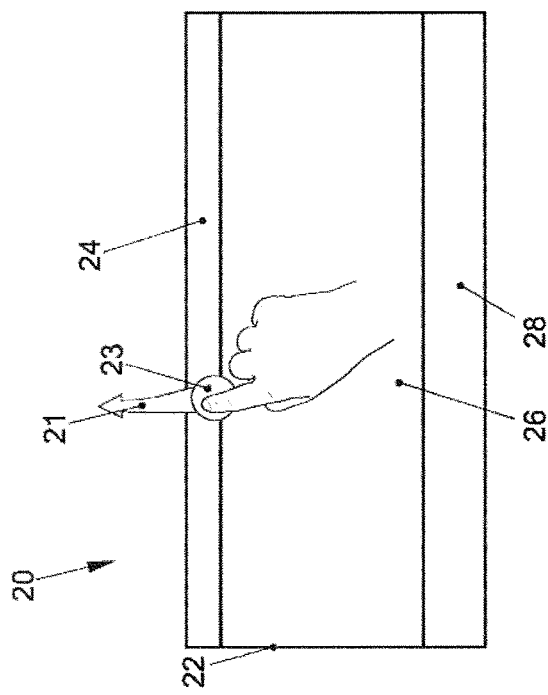

FIG. 4*b* shows an example of a state of the display device 20 with the status bar 24 hidden. The user again has several options available for showing the status bar 24 again. By way of example, the user can touch the display area in the region in which the status bar 24 was previously situated and, in the event of a status bar 24 being arranged at the upper edge of the display device 20, can make a drag movement downward. There is also the option of tapping on the display device 20 in the region in which the status bar 24 was previously situated. A further option would be for the display device 20 to react to an approach by the user by immediately showing the status bar 24. To this end, a proximity sensor can detect or identify an approach (e.g. drop below a predefined, stipulated distance) to the display device and transmit an appropriate signal to the processor, for example. In the latter case, lucid presentation of contents would be possible, but immediate access to the status bar 24 without further contact would additionally be possible. However, all options allow immediate access to the status bar 24. This keeps the time involvement for operator control short.

In some exemplary embodiments, the selection signal 16 has information about a start 23, which is situated within one of a plurality of subregions 26*a*, 26*b* that each reproduce a content in a different information category, and an end 25, which is situated within another of the plurality of subregions 26*a*, 26*b* that each reproduce a content in a different information category 30, of a continuously touching movement 21. In addition, the processor 10 can take the selection signal 16 as a basis for prompting the subregion 26*a*, 26*b* comprising the start 23 to be reproduced by the display device 20 in a manner shifted to the end 25 and the subregion 26*a*, 26*b* comprising the end 25 to be reproduced by the display device 20 in a manner shifted in the direction of the start 23.

Figure 5A:
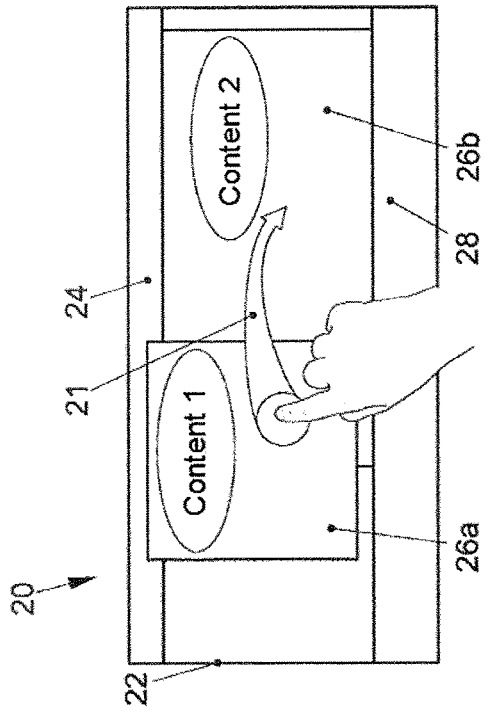
FIGS. 5a-5d show a schematic illustration of the shifting of contents within the display area of the display device.
Figure 5B:
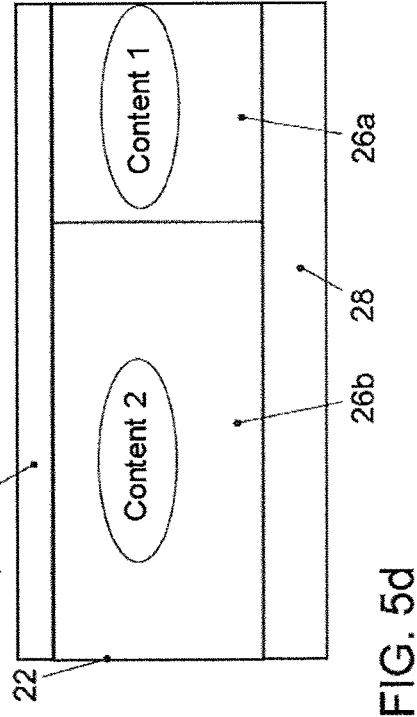
Figure 5C:
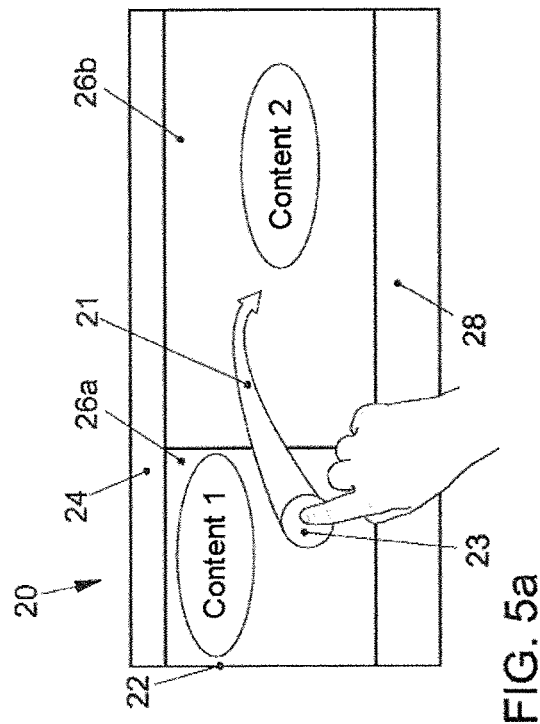
Figure 5D:
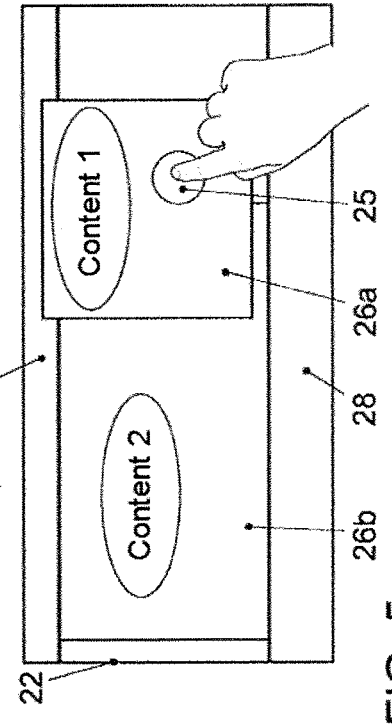

In other words, two subregions 26*a*, 26*b* that each reproduce a content can be interchanged by means of an appropriate drag movement. FIGS. 5*a* to 5*d* each show exemplary embodiments of the individual steps of such interchange of two subregions. In the example, a user selects the subregion 26*a* by means of a touch. The start 23 of the touching movement 21 is therefore situated in the subregion 26*a* (FIG. 5*a*). If the user now performs a drag movement, e.g. using his finger, the corresponding subregion 26*a* is dragged to the right, for example (FIG. 5*b*). Once the user has reached the end 25, at which he wishes to present the content "Content 1" presented in the subregion 26*a*, with his drag movement, he can terminate the drag movement at that location and "drop" the subregion 26*a* at this point (FIG. 5*c*). The subregion 26*b* that contains the end 25 is then shifted toward the start 23, so that it then at least to some extent occupies the space that the other subregion 26*a* previously occupied. In the example, a subregion 26*a* is shifted from left to right and accordingly a second subregion 26*b* is shifted from right to left. Alternatively, however, two subregions 26*a*, 26*b* could also be arranged above one another, which would allow the upper subregion to be interchanged with the lower.

Optionally, additionally or alternatively, the touch and the movement can be produced in several different ways. One example would be simple touching of the relevant subregion 26a, 26b with one finger and subsequent dragging. A further option would be to perform the same touch and movement with two fingers. By way of example, the system can identify when the same subregion is touched with two fingers and accordingly discern the beginning of a shift action. A further example is that first of all the subregion 26a, 26b is touched for a longer time (e.g. for longer than a predefined time), for example for a period of two seconds, which activates the subregion 26a, 26b for shifting, and then the drag movement for interchanging two subregions 26a, 26b is performed. Besides these exemplary methods, other methods would also be conceivable, however (e.g. double clicking and then dragging). The shifting of subregions 26a, 26b within the display region 22 provides a user with the option of displaying particular contents at the location that he individually prefers and in this way finding the desired or necessary contents more quickly.

In some exemplary embodiments, the selection signal 16 has information about a start 23, which is situated within a subregion 26a, 26b that reproduces a content in a content category 30, and an end 25, which is situated closer than a predefined distance to the right-hand or left-hand edge of the display area 22 of the display device 20 as seen by a user, of a continuously touching movement 21. The processor 10 can then prompt the reproduction of the content of the subregion 26a, 26b that has the start 23 on a further, additional display device 60.

In other words, the user has the opportunity to use a drag movement to convey a particular content from the display area 22 to a further display unit 60 for reproduction. By way of example, the further display unit 60 may be a combined instrument situated behind the steering wheel, but also a mobile unit, such as a laptop, smartphone or tablet. Intuitively, the drag movement can be effected in the direction in which the additional display unit 60 is situated. By way of example, the predefined distance from the edge of the display area 22 can be a finger width or one centimeter (or 0.5 cm or 2 cm, for example). In this case, as when interchanging two subregions 26a, 26b, touch and movement can be produced in several different ways (e.g. short touch with one finger and subsequent dragging, short touch with two fingers and subsequent dragging, longer touch with one finger and subsequent dragging or double click and subsequent dragging).

Figure 6:
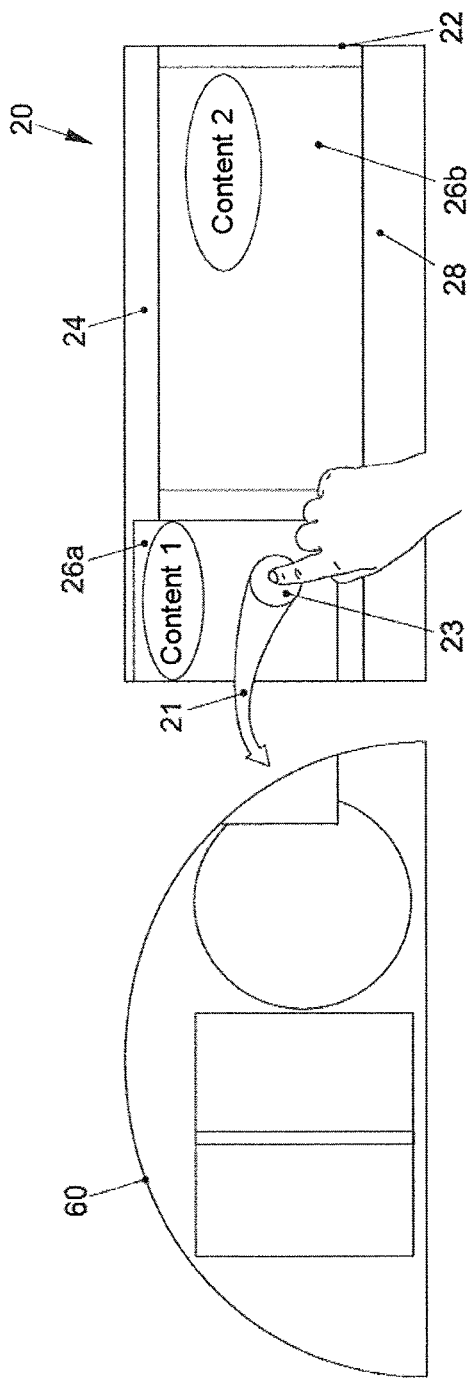
FIG. 6 shows a schematic illustration of the shifting of contents from the display area of the display device to the display area of a further display unit.

FIG. 6 shows an example of the shifting of a content "Content 1" from the display area 22 of a display device 20 to an additional display unit 60. In the example, the latter is provided as a combined instrument, which is arranged to the left of the display device 20. By replacing the start 23 in the subregion 26a that is to be shifted, "Content 1" is selected and is dragged in the direction of the edge by a touching movement 21. When the movement ends at a predefined distance from the edge of the display area 22, "Content 1" is then presented on the combined instrument 60. This function is very useful, for example, when a driver of a vehicle, as user, wishes to keep an important piece of information constantly in view, such as a navigation map or a fuel tank level indicator. This provides the driver with the option of having a content reproduced on a combined instrument, for example, that is situated more centrally in his field of view.

In exemplary embodiments, the selection signal 16 can additionally or alternatively have information about a start 23, which is situated within a subregion 26a, 26b that reproduces a content in a content category 30, and an end 25, which is situated within a region of the status bar 24, of a continuously touching movement 21. After that, it is then possible for the processor 10 to take the selection signal 16 as a basis for reproducing reproduction of the content in the status bar 24 by the display device with an information content (e.g. as a symbol or keyword) that is reduced in comparison with the information content displayed in the subregion 26a, 26b.

Figure 7B:
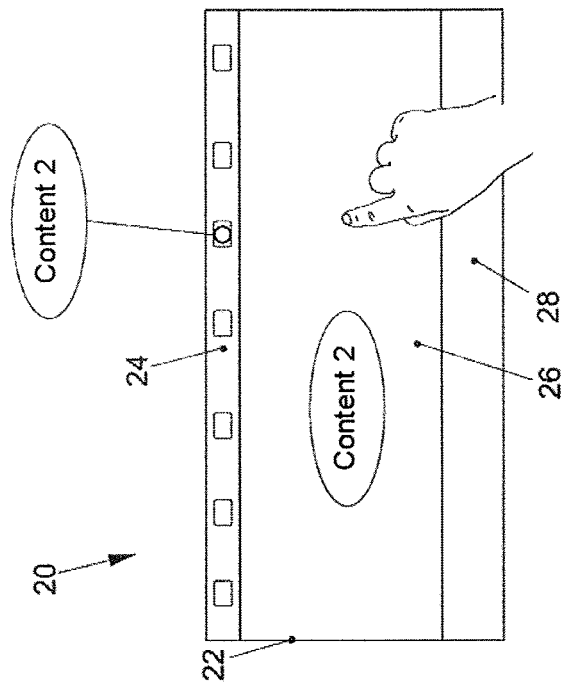
FIGS. 7a and 7b show a schematic illustration of the individual population of the status bar with contents.
Figure 7A:
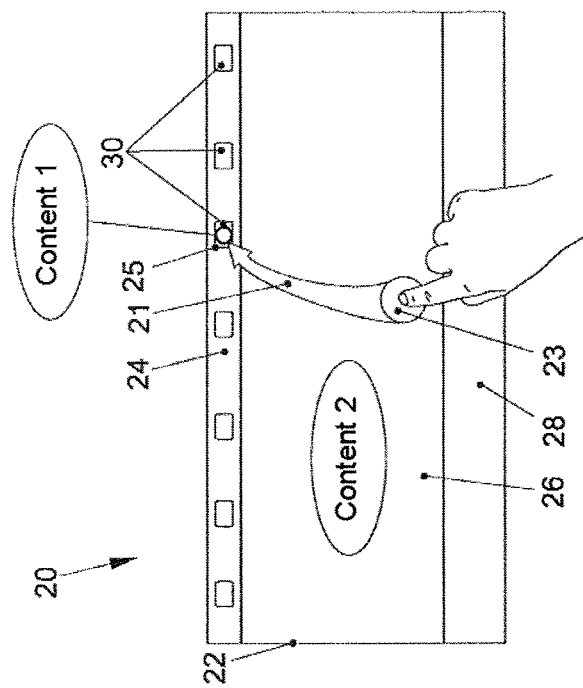

In other words, the status bar 24 can be individually populated by dragging a displayed content from a subregion 26a, 26b of the display region 22 to the status bar. FIG. 7a shows an example of a presentation in which "Content 2" is presented in a subregion 26 of the display region 22. A user now performs a touching movement 21, the start 23 of which is situated within the subregion 26 and the end 25 of which is situated within the status bar 24, and at the same time a content category is associated with "Content 1". As FIG. 7b shows, "Content 2" is now displayed in the status bar 24 instead of "Content 1". This provides the user with the opportunity to configure the status bar 24 individually by populating the status bar with contents that the user uses particularly often, for example. Important or favorite contents can thus be made very quickly accessible for the user.

Alternatively, optionally or additionally, the selection signal 16 has information about a contact point situated within a control bar 28 that is reproduced at one edge of the display area 22 of the display device 20. The processor 10 can take the selection signal 16 as a basis for prompting control of a functionality 29 that is represented by the content in the content category 30.

Figure 8:
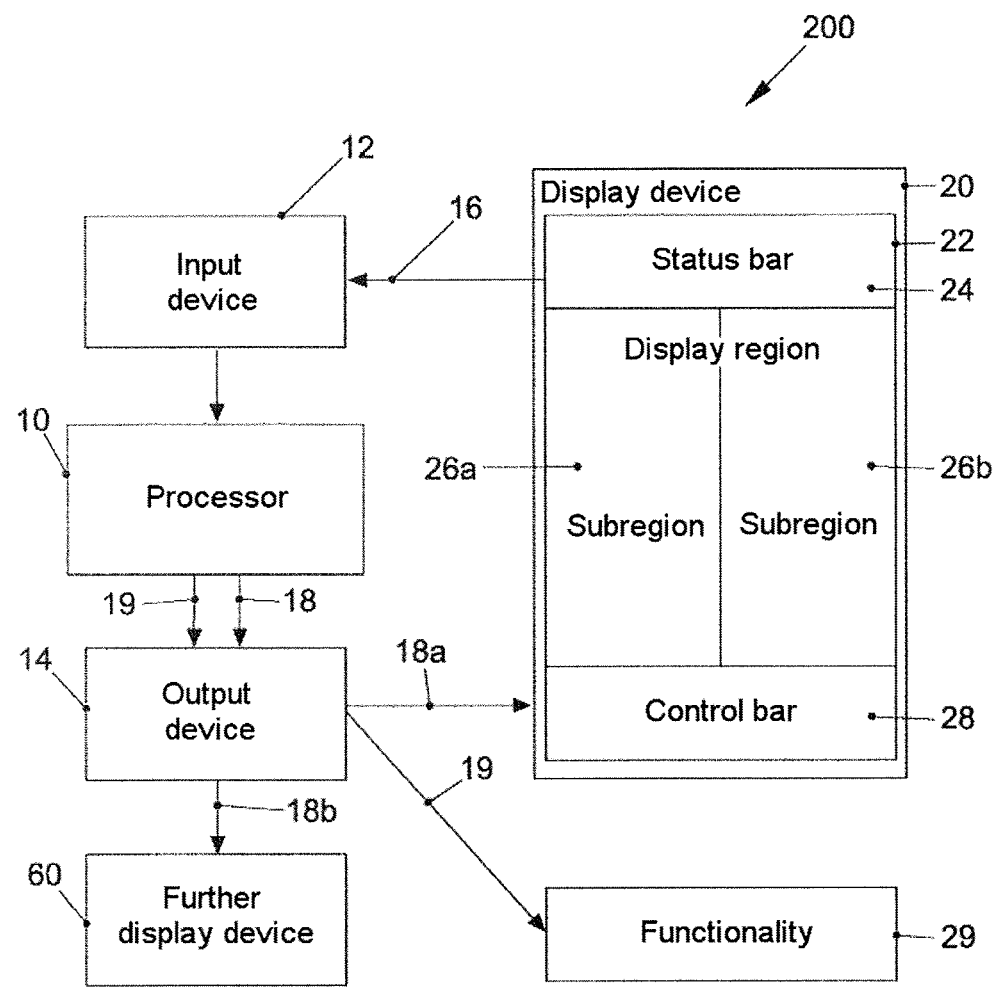
FIG. 8 shows a block diagram of an information reproduction system.

FIG. 8 shows a block diagram of an information reproduction system 200 according to at least one exemplary embodiment. The information reproduction system 200 is based on the previously described concept and the optional, alternative or additional aspects that have been described in connection with one or more exemplary embodiments. The display device 20 reproduces the display area 22, the status bar 24, subregions 26a, 26b of the display region 22 and a control bar 28.

The processor 10 can produce a reproduction of the status bar 24 by the display device 20 at the upper edge, as seen by the user, of the display area 22 of the display device 20. Presentation of the status bar 24 at the upper edge of the display region 22 can provide an intuitively simple type of presentation and a high level of user friendliness. This presentation is also shown in FIGS. 2 to 8 by way of example.

Optionally, the information reproduction system 15 can have a display device 20 for reproducing contents on the basis of a video or control signal 18 produced by the processor 10 and a further display device 60 for reproducing contents on the basis of a video or control signal 18 produced by the processor 10. In other words, a multiplicity of units may be suitable for communication with the processor 10. Thus, by way of example, a combined instrument may also be an infotainment system or included by such a system. Examples of an additional display device 60 have already been cited. Both the display device 20 and a further display device 60 may be permanently installed in the vehicle.

Some exemplary embodiments additionally relate to a vehicle having a permanently installed information reproduction system based on the concept described or based on at least one of the exemplary embodiments. This may be a land vehicle (e.g. automobile or truck), but there are also implementation options in watercraft, or aircraft.

Figure 9:
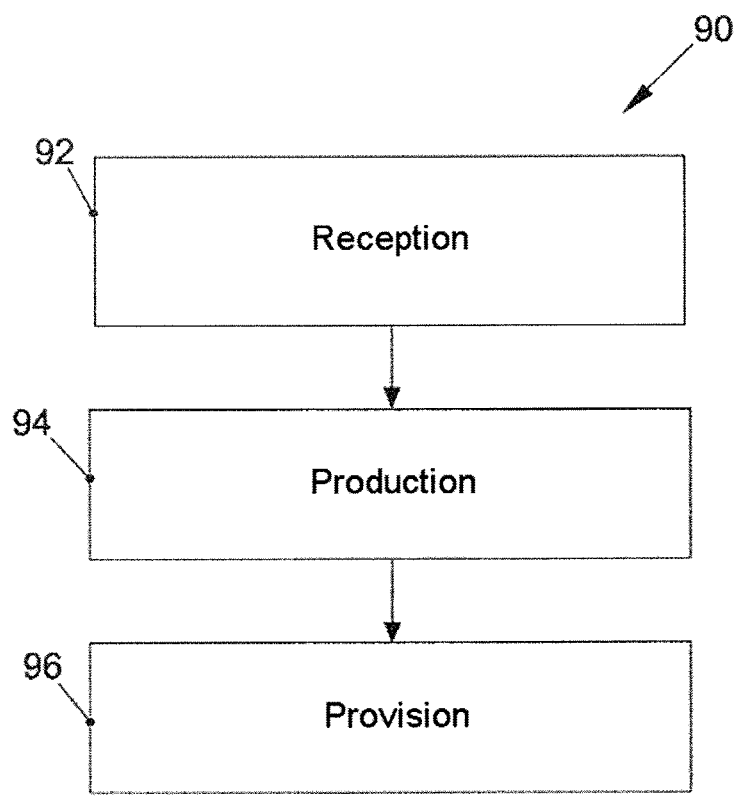
FIG. 9 shows a flowchart for a method for providing information for a user of a vehicle.

FIG. 9 shows a flowchart for a method 90 for providing information for the user of a vehicle according to at least one exemplary embodiment. The method 90 comprises reception 92 of a selection signal 16. The method 90 also comprises production 94 of a video or control signal 18, 18*a*, so that a status bar 24 arranged at one edge of a touch-sensitive display area 22 of a display device 20 and a display region that adjoins the status bar 24 can be reproduced on the display area 22 by the display device 20 on the basis of the video or control signal 18. In this case, the selection signal 16 has information about a start 23 and an end 25 of a movement 21, by a user, that continuously touches the display area 22 of the display device 20. In this case, the start 23 is situated in the region of the status bar 24 and the end 25 is situated in the display region. In addition, the production 94 of the video or control signal 18, 18*a* is effected on the basis of the selection signal 16, so that a content in a content category 30 that is displayed so as to be selectable at the location of the start 23 can be reproduced by the display device 20 in at least one subregion 26*a*, 26*b* of the display region, which subregion is situated at least to some extent in a half of the display region that comprises the end 25, with an information content that is extended in comparison with the information content displayed in the status bar 24. Finally, the method 90 comprises provision 96 of the video or control signal 18, 18*a* for a display device 20.

The method 90 can comprise further optional, additional or alternative method steps that correspond to optional, additional or alternative embodiments that have been explained in connection with the previously described concept or previously described exemplary embodiments.

In some exemplary embodiments, a status display of information is provided in the vehicle as an interactive bar, e.g. at the upper screen edge. It is also possible to reach the settings and control panels associated with the status information without indirect routes, for example using a main menu.

Some exemplary embodiments relate to the dragging and dropping of operator control elements on touch screens in conjunction with 2-finger gestures and an individually populatable main menu or an interactive drag-and-drop status bar in the infotainment system. To this end, a region is reserved in the upper screen region of the infotainment system of the vehicle in which the current status of the infotainment system and of the vehicle is displayed (e.g. "steering wheel heating activated": the steering heating icon is shown; "steering wheel heating deactivated": the icon is hidden). This allows a purely static display to be extended to produce an interactive element. That is to say that the user is able to use drag and drop to shift the status icons (currently activated functions) that are displayed in the status line to the region below the status line, to "drop" them there and to display them there, so as then also to be able to operate them. The concept can also be combined with a split screen concept. Drag and drop from the status line allows the user to directly access the contents and settings that are associated with the status information. An indirect route to these settings via a main menu can be avoided. The relevant functionality can be accessed directly by means of drag and drop. In addition, the status displays can be individually extended by functions using drag and drop.

The status line in the infotainment system can thus be extended by an interactive drag and drop function. Hence, the user is able to quickly display and configure a function without having to click through the respective menus to do so. Following the drag-and-drop action, an evaluation can be performed with regard to that half of the infotainment system in which the icon for the function has been dropped, and accordingly a split screen window in which the function can be operated can be shown on the left-hand or right-hand side. The status can be provided with a link. In addition, this information may be individually extendable by functions and/or shortcuts.

In some exemplary embodiments, elements can be dragged from the status bar to change to the new context, this being able to be done in different ways. In the case of an initial full screen display, the new context appears in a ⅓ split screen, for example, the position of which is dependent on the side to which the elements are dragged. In the case of a previous split screen display, there are again several variants. In one variant, the previous ⅓ split screen disappears and the previous ⅔ split screen remains, the new position of the ⅔ split screen being dependent on the position of the new ⅓ split screen. In another variant, the split screen to which the elements are dragged changes to the new context.

In some exemplary embodiments, the status bar can be hidden by swiping upward or briefly touching or tapping on the vacant region. The status bar is shown by swiping downward or by tapping on the original position.

Some exemplary embodiments describe the status bar additionally as a resolvable and individually populatable menu. This acts as a shortcut menu, e.g. at the upper screen edge in a similar manner to the control bar at the lower screen edge. The display of the status bar reacts to an approach by a user in the similar manner to the display of the control bar, for example. Menu items can be rearranged and filled by means of drag and drop.

In some exemplary embodiments, drag and drop allows the positions of the split screens to be swapped. The process of undocking and swapping position is represented by an animation, for example, in a similar manner to the slider concept in a user programmable combined instrument (FBK). Several variants exist in this regard. In one variant, the dragging is effected using a finger. The process may be different when displaying a map, since in that case the map is moved. In the further variant, a longer touch (long press) is effected using a finger, with undocking being followed by dragging. In yet a further variant, two fingers are used for dragging, for example. The latter two variants represent hidden features, for example, that a user can use.

In some exemplary embodiments, the left-hand subregion (⅓ or ⅔ split screen or else full screen) can be shifted to the left to the digital combined instrument, for example. This can be effected independently of a dedicated replacement button. The gesture is similar to the gesture for the split screen swap (e.g. long press/one-finger or two-finger gesture), for example. In one variant, operator control is continued in the digital combined instrument, for example. In another variant, the new context is placed in the combined instrument, e.g. always on the central display space.

The features disclosed in the description above, the claims below and the appended figures can be of significance for substantiating an exemplary embodiment in its various refinements, and implemented, either individually or in any combination.

Although some aspects have been described in connection with an apparatus, it is self-evident that these aspects can also be a description of the corresponding method, which means that a block or a component of an apparatus can also be understood as a corresponding method step or as a feature of a method step. Similarly, aspects that have been described in connection with or as a method step are also a description of a corresponding block or detail or feature of a corresponding apparatus.

Depending on particular implementation requirements, exemplary embodiments can be implemented in hardware or in software. The implementation can be performed using a digital storage medium, for example a floppy disk, a DVD, a Blu-Ray disk, a CD, a ROM, a PROM, an EPROM, an EEPROM or a flash memory, a hard disk or another magnetic or optical memory on which electronically readable control signals are stored that can interact or do interact with a programmable hardware component such that the respective method is performed.

A programmable hardware component can be formed by a processor, a computer processor (CPU=central processing unit), a graphic processor (GPU=graphics processing unit), a computer, a computer system, an application-specific integrated circuit (ASIC), an integrated circuit (IC), a system on chip (SOC), a programmable logic element or a field-programmable gate array (FPGA) with a microprocessor.

The digital storage medium may, therefore, be machine- or computer-readable. Some exemplary embodiments thus comprise a data storage medium that has electronically readable control signals that are capable of interacting with a programmable computer system or a programmable hardware component such that one of the methods described herein is performed. At least one exemplary embodiment is, therefore, a data storage medium (or a digital storage medium or a computer-readable medium) on which the program for performing one of the methods described herein is recorded.

In general, exemplary embodiments can be implemented as a program, as firmware, as a computer program or computer program product with a program code or as data, the program code or the data being active to perform one of the methods when the program is executed on a processor or a programmable hardware component. The program code or the data may also be stored on a machine-readable medium or data storage medium, for example. The program code or the data can be present as source code, machine code or byte code, inter alia, and as other intermediate code.

A further exemplary embodiment is additionally a data stream, a signal train or a sequence of signals that represent(s) the program for performing one of the methods described herein. By way of example, the data stream, the signal train or the sequence of signals can be configured to be transferred via a data communication connection, for example by the Internet or another network. Exemplary embodiments are thus also signal trains that represent the data and are suitable for sending via a network or a data communication connection, with the data representing the program.

A program according to at least one exemplary embodiment can implement one of the methods, during the performance thereof, for example by virtue of the method reading memory locations or writing a datum or a plurality of data thereto, which possibly brings about switching processes or other processes in transistor structures, in amplifier structures or in other electrical, optional, magnetic components or components operating according to a different operating principle. Accordingly, reading a memory location allows data, values, sensor values or other information to be captured, determined or measured via a program. A program can therefore capture, determine or measure magnitudes, values, measured variables and other information by reading one or more memory locations, and can bring about, prompt or perform an action, and actuate other units, machines and components, by writing to one or more memory locations.

Modern vehicles today already contain a large number of units that can be used for reproducing a wide variety of information. The information to be reproduced ranges from vehicle condition parameters, such as speed, engine speed, fuel tank level or odometer, through navigation and communication information to entertainment media, such as films, radio or games. In this context, the volume of available information is becoming ever greater. Accordingly, the number and variety of display systems are also rising. Today, it is possible to find not only analog display instruments, for example, but also LED displays (light emitting diode), TFT screens (thin film transistor) or touch-sensitive screens, what are known as touch screens.

The document DE 10 2010 048 745 A1 discloses a user interface in a motor vehicle. The user interface comprises at least one operator control device and a display device. In this case, selection of an object presented on the display device can be captured by means of the operator control device. Detection of the beginning of a shift operation for the object allows predetermined object-specific target regions that are presented on the display device to be denoted graphically in this case.

In addition, the document DE 10 2010 013 843 A1 describes an operator control apparatus having a display area for presenting information and a mechanical operator control element that comprises a movable operating element that, in the direction of view onto the display area, has at least regions arranged in front of the display area and covers a portion of the display area. The movable operating element is transparent at least in a region arranged in front of the display area, so that a display reproduced on the display area can be identified through the transparent region of the operating element.

The document DE 10 2010 013 170 A1 discloses an apparatus for operator control of a plurality of different functions of a motor vehicle, which apparatus has an operator control element, which can be used to actuate a respective one of the plurality of different functions, and a touch-sensitive panel that has a plurality of sections that each, at least temporarily, have one of the different functions associated with them and that are provided with symbols corresponding to the respective function. Selection of one of the sections allows a function to be selected. The operator control element can be used to actuate the respective function previously selected from the touch-sensitive panel. On the operator control element or in direct proximity to the operator control element there is a display device provided in which the respectively selected function can be displayed by means of a symbol.

The exemplary embodiments described above are merely an illustration of the principles of the present disclosure. It goes without saying that modifications and variations of the arrangements and details described herein will be evident to other persons skilled in the art. The intention is, therefore, that the disclosure will be limited only by the scope of protection of the patent claims that follow and not by specific details that have been presented herein on the basis of the description and the explanation of the exemplary embodiments.

The invention claimed is:

1. An information reproduction system for a vehicle, the system comprising:
   an input device designed to receive a selection signal, the input device including a display device that includes a touch-sensitive display area;
   a processor coupled to the input device and designed to produce a video or control signal, so that a status bar, arranged at one edge of the touch-sensitive display area of the display device and a display region on the display device that adjoins the status bar are both reproduced on the touch-sensitive display area by the display device based on the video or control signal, wherein the selection signal indicates information about a start and an end of a movement, by a user, wherein, during the user's movement, the user continuously touches the display area of the display device, wherein the start of the user's movement is detected in the region of the status bar and the end of the user's movement is detected in the display region of the display device, wherein the processor produces the video or control signal based on the selection signal so that content in a content category displayed at a detected location of the user's movement start on the status bar is reproduced on the display device in at least one subregion of the display region of the display device at a detected location of the user's movement end, wherein the subregion is situated at least to some extent in a half of the display region that includes the detected end of the user's movement, whereby the selected information content is displayed in the at least one subregion of the display region extended in comparison with the information content displayed in the status bar; and an output device designed to provide the video or control signal for the display device, wherein the display region includes both the status bar and also a control bar that is reproduced at one edge of the display region of the display device, wherein the selection signal indicates additional information about a contact point situated within the control bar, wherein the processor produces the control signal based on the selection signal so that a functionality corresponding to a content category that is displayed in the display region and that adjoins the control bar is controlled based on the additional information about the contact point situated within the control bar thereby enabling interactive user operator control based on simultaneous presentation and control functionality via the display device, and wherein the selection signal indicates additional information about the detected user's movement start, situated within a subregion that reproduces content in a content category, and the detected user's movement end, which is situated within a region of the status bar, wherein the processor produces the video or control signal based on the selection signal so that the content category is reproduced in the status bar by the display device with a reduced information content in comparison with the information content displayed in the subregion.

2. The information reproduction system of claim 1, wherein the processor produces the video or control signal based on the selection signal so that the user's movement end is detected outside the subregion that reproduces the content.

3. The information reproduction system of claim 1, wherein the processor produces the video or control signal so that selected content is displayed based on the selection signal along with content of at least one further content category in at least one further subregion of the display region by the display device.

4. The information reproduction system of claim 1, wherein, in response to detection of the user's movement end within a subregion of the display region that already has contents in a previously selected content category, the processor produces the video or control signal based on the selection signal so that the content in the previously selected content category are reproduced by the display device in another subregion shifted away from the subregion where the user's movement end has been detected.

5. The information reproduction system of claim 1, wherein the selection signal indicates additional information about the detected user's movement start, which is situated within an edge region that comprises the status bar, and detected user's movement end, which is situated closer to the edge of the display area in comparison with the user's movement start or additional information about a contact point situated within a region of the status bar that is not associated with an information category, wherein the edge region extends from an edge of the display area that bounds the status bar to a distance that corresponds to twice the width of the status bar, wherein the processor produces the video or control signal based on the selection signal so that the status bar is hidden based on the detected touch.

6. The information reproduction system of claim 5, wherein the selection signal indicates information about the detected user's movement start, which is no more than a width of the status bar away from the edge of the display device, and the detected user's movement end, which is situated further away from the edge of the display device in comparison with the user's movement start indicates information about a contact point situated no more than the width of the status bar away from the edge of the display device or indicates information about an approach by a user to the display device, wherein the processor produces the video or control signal based on the selection signal so that the status bar is shown on the display area of the display device.

7. The information reproduction system of claim 1, wherein the selection signal indicates information about the detected user's movement start, which is situated within one of a plurality of subregions that each reproduce content in a different information category, and the detected user's movement end, which is situated within another of the plurality of subregions that each reproduce content in a different information category, wherein the processor produces the video or control signal based on selection signal so that the subregion wherein the user's movement start is reproduced by the display device shifted to subregion wherein the user's movement end has been detected and the subregion wherein the user's movement end is reproduced by the display device shifted toward the subregion wherein the user's movement start has been detected.

8. The information reproduction system of claim 1, wherein the selection signal indicates additional information about the detected user's movement start, situated within a subregion that reproduces content in a content category, and the detected user's movement end, which is situated closer than a predefined distance to the right-hand or left-hand edge of the display area of the display device as displayed to the user, wherein the processor produces a further video or control signal based on the selection signal so that at least part of the content of the subregion including the detected user's movement start is reproduced on a further additional display unit.

9. The information reproduction system of claim 1, wherein the processor produces the video or control signal so that the status bar is reproduced by the display device at the upper edge, as displayed to the user, of the display area of the display device.

10. A vehicle having an information reproduction system that includes:

an input device designed to receive a selection signal, the input device including a display device that includes a touch-sensitive display area;

a processor coupled to the input device and designed to produce a video or control signal, so that a status bar, arranged at one edge of the touch-sensitive display area of the display device and a display region on the display device that adjoins the status bar are both reproduced on the touch-sensitive display area by the display device based on the video or control signal, wherein the selection signal indicates information about a start and an end of a movement, by a user, wherein, during the user's movement, the user continuously touches the display area of the display device, wherein the start of the user's movement is detected in the region of the status bar and the end of the user's movement is detected in the display region of the display device, wherein the processor produces the video or control signal based on the selection signal so that a content in a content category displayed at a detected location of the user's movement start on the status bar is reproduced on the display device in at least one subregion of the display region of the display device at a detected location of the user's movement end, wherein the subregion is situated at least to some extent in a half of the display region that includes the detected end of the user's movement, whereby the selected information content is displayed in the at least one subregion of the display region extended in comparison with the information content displayed in the status bar; and an output device designed to provide the video or control signal for the display device, wherein the display region includes both the status bar and also a control bar that is reproduced at one edge of the display region of the display device, wherein the selection signal indicates additional information about a contact point situated within the control bar, wherein the processor produces the control signal based on the selection signal so that a functionality corresponding to a content category that is displayed in the display region and that adjoins the control bar is controlled based on the additional information about the contact point situated within the control bar thereby enabling interactive user operator control based on simultaneous presentation and control functionality via the display device, and wherein the selection signal indicates additional information about the detected user's movement start, situated within a subregion that reproduces content in a content category, and the detected user's movement end, which is situated within a region of the status bar, wherein the processor produces the video or control signal based on the selection signal so that the content category is reproduced in the status bar by the display device with a reduced information content in comparison with the information content displayed in the subregion.

11. A method for providing information for the user of a vehicle, the method comprising:

receiving a selection signal;

producing a video or control signal so that a status bar is arranged at one edge of a touch-sensitive display area of a display device and a display region that adjoins the status bar is reproduced on the display area by the display device based on the video or control signal, wherein the selection signal indicates information about a start and an end of a movement, by a user, wherein during the user's movement, the user continuously touches the display area of the display device, wherein the user's movement start is detected in a region of the status bar and the user's movement end is detected in the display region, wherein the video or control signal is produced based on the selection signal so that content in a content category displayed at a detected location of the user's movement start is reproduced on the display device in at least one subregion of the display region of the display device at a detected location of the user's movement end, wherein the subregion is situated at least to some extent in a half of the display region that includes the detected end of the user's movement, whereby the selected information content is displayed in the at least one subregion of the display region extended in comparison with the information content displayed in the status bar; and providing the video or control signal for a display device, wherein the display region includes both the status bar and also a control bar that is reproduced at one edge of the display region of the display device, wherein the selection signal indicates additional information about a contact point situated within the control bar, wherein the processor produces the control signal based on the selection signal so that a functionality corresponding to a content category that is displayed in the display region and that adjoins the control bar is controlled based on the additional information about the contact point situated within the control bar thereby enabling interactive user operator control based on simultaneous presentation and control functionality via the display device, and wherein the selection signal indicates additional information about the detected user's movement start, situated within a subregion that reproduces content in a content category, and the detected user's movement end, which is situated within a region of the status bar, wherein the processor produces the video or control signal based on the selection signal so that the content category is reproduced in the status bar by the display device with a reduced information content in comparison with the information content displayed in the subregion.

12. A program stored on a computer-readable medium and having a program code which, when executed on a computer, a processor or a programmable hardware component performs a method comprising:

receiving a selection signal;

producing a video or control signal, so that a status bar arranged at one edge of a touch-sensitive display area of a display device and a display region that adjoins the status bar can be reproduced on the display area by the display device based on the video or control signal, wherein the selection signal has information about a start and an end of a movement, by a user, that continuously touches the display area of the display device the start being situated in the region of the status bar and the end being situated in the display region, wherein the video or control signal is produced based on the selection signal so that a content in a content category that is displayed so as to be selectable at a detected location of the user's movement start is reproduced on the display device in at least one subregion of the display region of the display device at a detected location of the user's movement end, wherein the which subregion is situated at least to some extent in a half of the display region that includes the detected end of the user's movement, whereby the selected information content is displayed in the at least one subregion of the display region extended in comparison with an information content that is extended in comparison with the information content displayed in the status bar; and providing the video or control signal for a display device,
wherein the display region includes both the status bar and also a control bar that is reproduced at one edge of the display region of the display device, wherein the selection signal indicates additional information about a contact point situated within the control bar, wherein the processor produces the control signal based on the selection signal so that a functionality corresponding to a content category that is displayed in the display region and that adjoins the control bar is controlled based on the additional information about the contact point situated within the control bar thereby enabling interactive user operator control based on simultaneous presentation and control functionality via the display device, and wherein the selection signal indicates additional information about the detected user's movement start, situated within a subregion that reproduces content in a content category, and the detected user's movement end, which is situated within a region of the status bar, wherein the processor produces the video or control signal based on the selection signal so that the content category is reproduced in the status bar by the display device with a reduced information content in comparison with the information content displayed in the subregion.

* * * * *